United States Patent
Litchfield et al.

(10) Patent No.: US 9,593,784 B2
(45) Date of Patent: Mar. 14, 2017

(54) KNIT FABRIC AND AN ARTICLE COMPRISING SAME

(71) Applicant: E I DU PONT DE NEMOURS AND COMPANY, Wilmington, DE (US)

(72) Inventors: David William Litchfield, Midlothian, VA (US); Carlo Fiorella, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/951,558

(22) Filed: Nov. 25, 2015

(65) Prior Publication Data
US 2016/0076674 A1   Mar. 17, 2016

Related U.S. Application Data

(62) Division of application No. 13/905,522, filed on May 30, 2013, now Pat. No. 9,188,255.

(51) Int. Cl.
*F16L 11/02* (2006.01)
*F16L 11/08* (2006.01)
(Continued)

(52) U.S. Cl.
CPC .............. *F16L 11/085* (2013.01); *B60C 9/11* (2013.01); *B60C 9/1807* (2013.04); *D04B 1/16* (2013.01);
(Continued)

(58) Field of Classification Search
USPC .................................. 138/123, 124, 125, 126
See application file for complete search history.

(56) References Cited

U.S. PATENT DOCUMENTS 3,108,357 A * 10/1963 Liebig ..................... A61L 27/20
                                                138/123
3,633,629 A *  1/1972 Rider ...................... B29C 53/66
                                                138/127
(Continued)

FOREIGN PATENT DOCUMENTS

WO   WO2010131216   11/2010
WO   WO2012000713    1/2012

OTHER PUBLICATIONS

Phyllis G. Tortora et al., Understanding Textiles, Fifth Edition, 1997, 9 pages.
(Continued)

*Primary Examiner* — James Hook

(57) ABSTRACT

A knit fabric suitable as a reinforcement for elastomeric articles comprises a plurality of reinforcement yarns wherein each course of the fabric comprises either a first or second yarn, the modulus of the first yarn being different from the modulus of the second yarn, and the courses comprising the first and second yarns are arranged in one of the following sequences, (a) alternating courses comprise first and second yarns respectively, (b) the courses form a repeat pattern of, in order, a course comprising a first yarn, two courses comprising a second yarn and a course comprising a first yarn or (c) the courses form a repeat pattern of, in order, a course comprising a second yarn, two courses comprising a first yarn and a course comprising a second yarn.

7 Claims, 6 Drawing Sheets

(51) Int. Cl.
  *D04B 1/16*  (2006.01)
  *D04B 1/22*  (2006.01)
  *D04B 9/44*  (2006.01)
  *B60C 9/18*  (2006.01)
  *B60C 9/11*  (2006.01)
  *B60C 9/02*  (2006.01)

(52) U.S. Cl.
  CPC ............... *D04B 1/22* (2013.01); *D04B 1/225* (2013.01); *D04B 9/44* (2013.01); *F16L 11/02* (2013.01); *B60C 9/02* (2013.01); *D10B 2505/02* (2013.01)

(56) References Cited

U.S. PATENT DOCUMENTS

| | | | | |
|---|---|---|---|---|
| 4,679,599 A | * | 7/1987 | Newberry | F16L 11/085 138/104 |
| 5,965,223 A | * | 10/1999 | Andrews | A41D 19/01511 138/123 |
| 7,572,745 B2 | | 8/2009 | Branch et al. | |
| 2004/0237599 A1 | * | 12/2004 | Kondou | D04B 1/18 66/202 |
| 2008/0072984 A1 | * | 3/2008 | Branch | B32B 1/08 138/124 |
| 2009/0049868 A1 | * | 2/2009 | Malloy | D04B 1/225 66/170 |
| 2009/0049869 A1 | * | 2/2009 | Malloy | D04B 1/22 66/170 |
| 2009/0116907 A1 | * | 5/2009 | Gaya I Altirriba | D06N 3/0009 405/45 |
| 2011/0162749 A1 | * | 7/2011 | Jeong | F16L 11/085 138/125 |
| 2012/0103498 A1 | * | 5/2012 | Lamontia | B60C 9/0042 152/548 |
| 2014/0110013 A1 | * | 4/2014 | Mezzalira | D04B 1/225 138/124 |

OTHER PUBLICATIONS

* cited by examiner

KNIT FABRIC AND AN ARTICLE COMPRISING SAME

CROSS REFERENCE TO RELATED APPLICATION

This application is a divisional application of application Ser. No. 13/905,522 filed May 30, 2013.

BACKGROUND

1. Field of the Invention

This invention relates to knitted reinforcement structures used for pressed or molded articles such as hoses for fluid conveyance.

2. Description of Related Art

U.S. Pat. No. 7,572,745 to Branch et al discloses an improved yarn for a knit reinforcement in a flexible hose. The flexible hose according to the invention may comprise a tube, a knit fabric, and a cover wherein said knit fabric comprises a hybrid yarn comprising a first yarn of co-para-aramid fibers and a second yarn of meta-aramid fibers. The co-para-aramid and meta-aramid yarns may be twisted, plied, folded, or commingled together to form a single hybrid reinforcing yarn for the hose. The knit fabric may reside between a tube and a cover and/or may be embedded in a layer of the hose. One or more layers of a knit fabric of hybrid yarn may be the primary reinforcing member of a hose.

PCT publication number WO2010/131216 to Mezzalira et al describes a flexible hose comprising, as viewed from the inside, at least one first inner layer made of a first thermoplastic polymer material, at least one reinforcement layer composed of a plurality of yarns knitted together to form a plurality of stitches of tricot type, and at least one second layer made of a second thermoplastic polymer material. At least one first yarn of said yarns that form said at least one reinforcement layer is a high tenacity fiber and at least one second yarn is a polyester fiber yarn or the like interwoven with the first yarn. A method of making such hose is also described.

PCT publication number WO2012/000713 to Brettschneider et al describes an article composed of a polymeric material which has been provided with an embedded reinforcement which consists wholly or partly of a textile material, characterized in that, in a first reinforcement variant, the textile material consists exclusively of polyoxadiazole (POD) and/or a POD derivative and/or a POD copolymer, or, in a second reinforcement variant, the textile material is a textile material combination consisting of POD and/or a POD derivative and/or a POD copolymer, and of at least one further textile material which is not part of the aforementioned POD group, or, in a third reinforcement variant, the textile material comprises a material combination consisting of POD and/or a POD derivative and/or a POD copolymer and at least one further material which is not part of any textile group. The article is more particularly a hose, more particularly again a charge-air hose, consisting of an inner layer and an outer layer of a polymeric material and an embedded reinforcement, for example in the form of a POD knit.

There is an ongoing need to provide knitted fabrics of improved mechanical strength that can enhance the properties of articles comprising the fabric, for example to increase the pressure carrying capability of a rubber hose.

SUMMARY OF THE INVENTION

This invention pertains to a knit fabric suitable as a reinforcement for tubular elastomeric articles comprising a plurality of first and second reinforcement yarns wherein,
(a) each course of the fabric comprises either a first or second yarn, the yarns having a tenacity of at least 2.2 g/dtex,
(b) the modulus of the first yarn is different from the modulus of the second yarn, and
(c) the courses comprising the first and second yarns are arranged in one of the following sequences,
  (i) alternating courses comprise first and second yarns respectively,
  (ii) the courses form a repeat pattern of, in order, a course comprising a first yarn, two courses comprising a second yarn and a course comprising a first yarn,
  (iii) the courses form a repeat pattern of, in order, a course comprising a second yarn, two courses comprising a first yarn and a course comprising a second yarn.

The invention also pertains to an article comprising the knit fabric.

DETAILED DESCRIPTION

Fabric

This invention pertains to a knit fabric. Knitting is the interlooping of yarn feedstock into vertical columns called wales and horizontal rows of loops called courses with fabric coming out of the machine in the wales direction.

In some embodiments, each course of the fabric comprise either a first reinforcing yarn or a second reinforcing yarn. The courses of first and second yarns are arranged in one of the following sequences (i) alternating courses comprise first and second yarns respectively, (ii) the courses form a repeat pattern of, in order, a course comprising a first yarn, two courses comprising a second yarn and a course comprising comprising a first yarn or (iii) the courses form a repeat pattern of, in order, a course comprising a second yarn, two courses comprising a first yarn and a course comprising a second yarn. This may be further explained by reference to the Figures.

Figure 1:
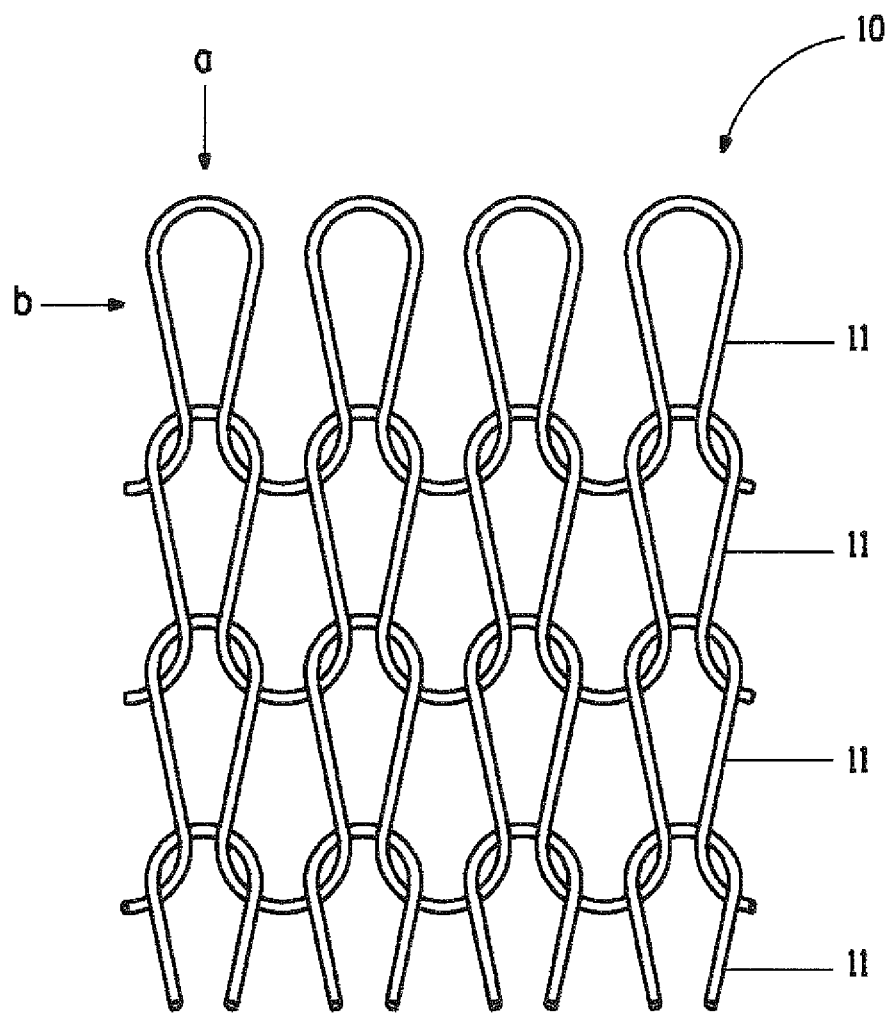
FIG. 1 is a view of part of a prior art knit fabric.

FIG. 1 shows a section of a prior art knitted fabric 10. Wales are indicated by the vertical orientation arrow "a" and courses by horizontal orientation arrow "b". The yarns 11 of this fabric are all the same and are either yarns of a single material or are blended (hybrid) yarns formed by twisting together at least two different yarns into a single hybrid yarn.

Figure 2:
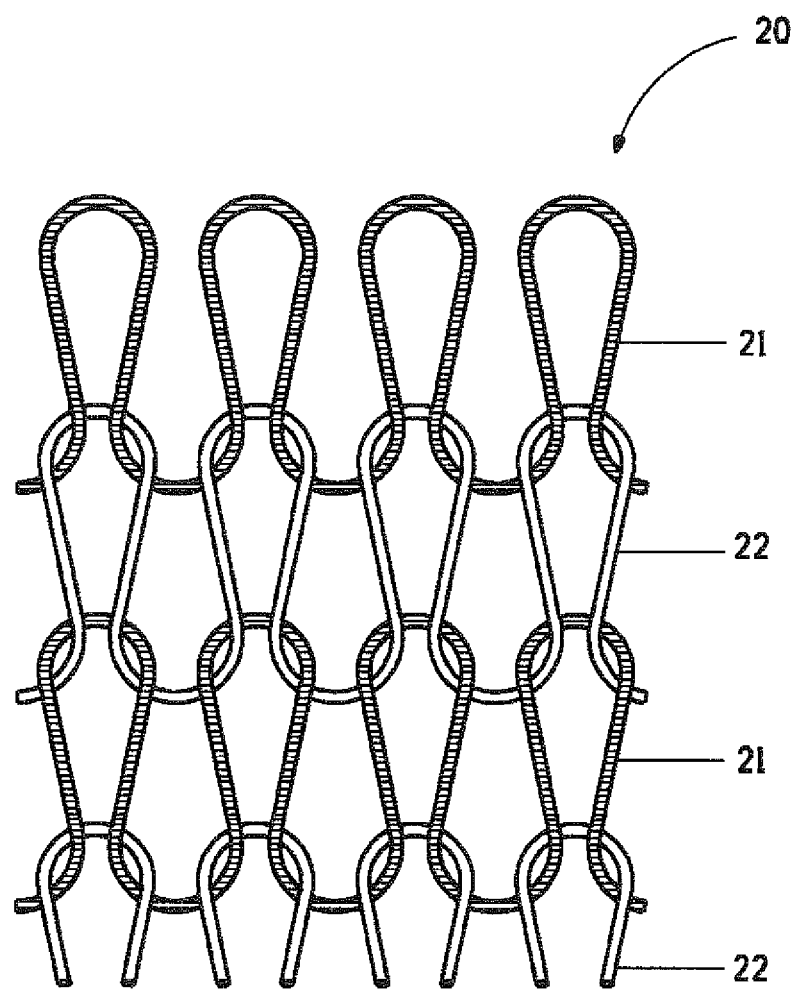
FIG. 2 shows one embodiment of a knit fabric of this invention.
Figure 3:
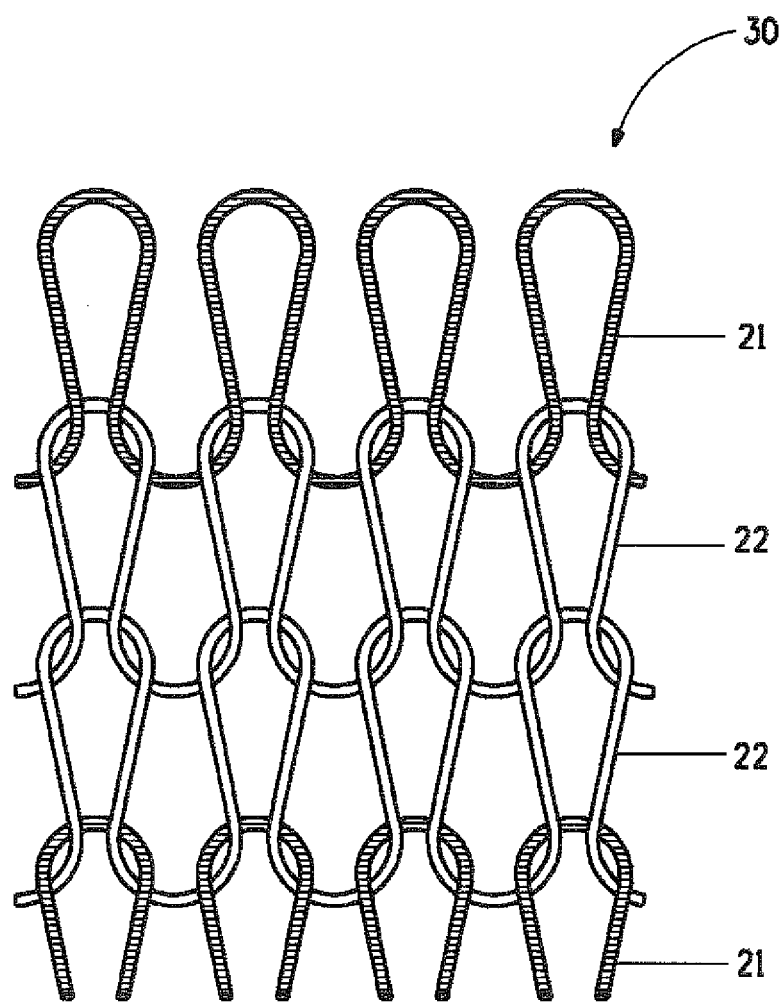
FIG. 3 shows another embodiment of a knit fabric of this invention.
Figure 4:
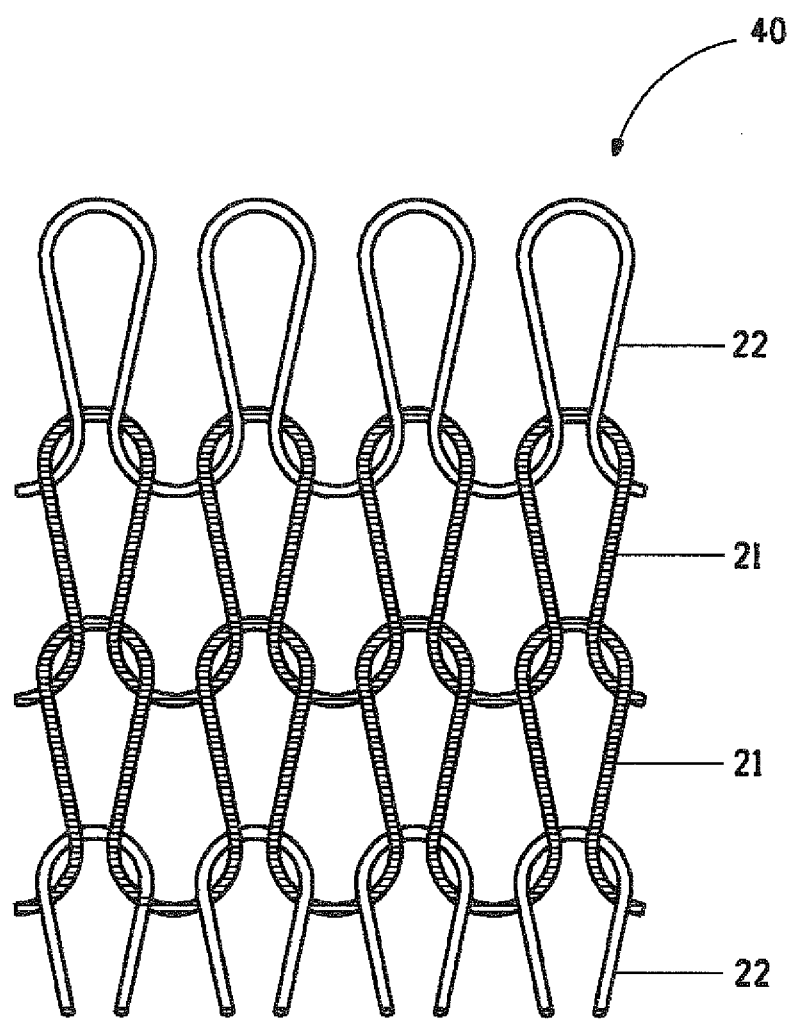
FIG. 4 shows yet another embodiment of a knit fabric of this invention.

FIG. 2 shows a section of one embodiment of this invention 20 comprising alternating courses of first yarns 21 and second yarns 22 respectively. FIG. 3 shows a section of another embodiment of this invention 30 in which the courses form a repeat pattern of, in order, a course comprising a first yarn 21, two courses comprising a second yarn 22 and a course comprising comprising a first yarn 21. FIG. 4 shows a section of yet another embodiment of this invention 40 in which the courses form a repeat pattern of, in order, a course comprising a second yarn 22, two courses comprising a first yarn 21 and a course comprising comprising a second yarn 22.

Figure 5:
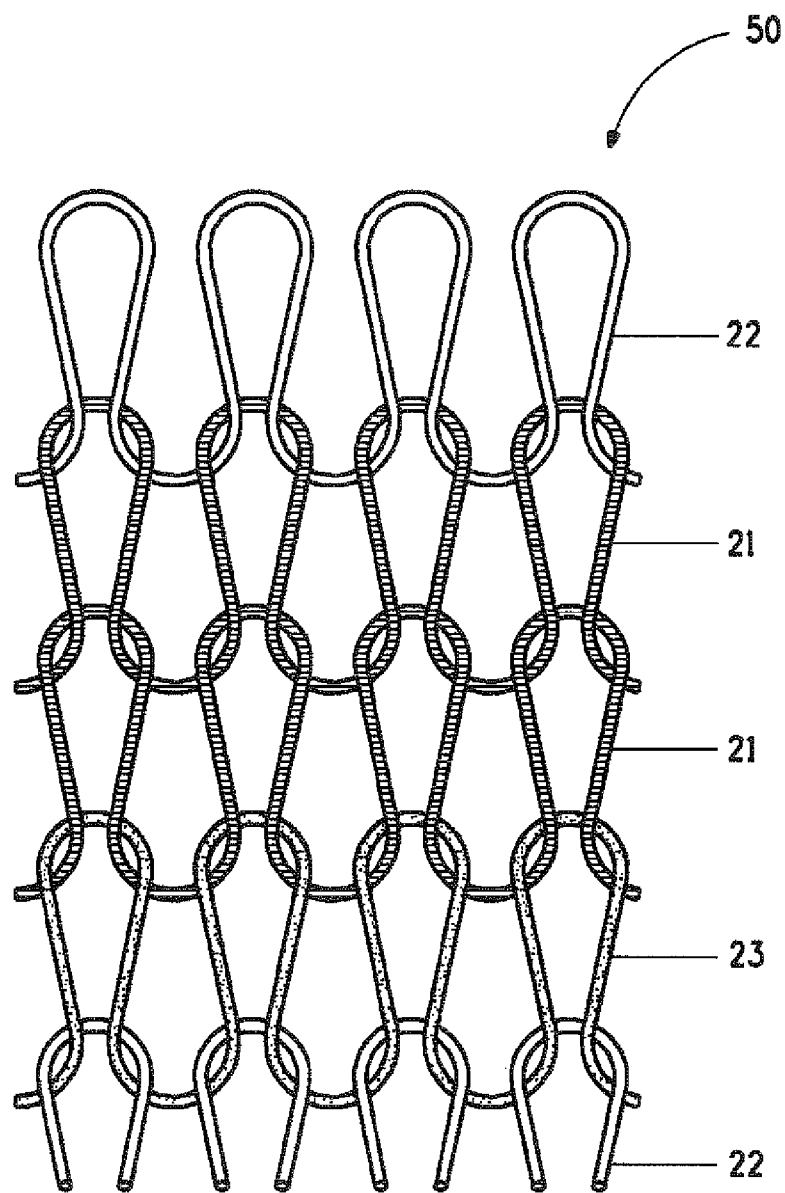
FIG. 5 shows a further embodiment of a knit fabric of this invention.

In some embodiments, the knit fabric comprises at least three different reinforcement yarns wherein, no more than two successive courses of the fabric comprise the same yarn. By "same yarn" is meant yarn of the same composition and having the same physical properties. An example of this is shown at 50 in FIG. 5 which shows five courses of a section of a knit fabric comprising in order a course of first yarns 22, followed by two courses of second yarns 21, a course of third yarns 23 and a course of first yarns 22.

Yarns

The first, second and third reinforcing yarns comprise fibers or filaments having a tenacity of at least 2.2 g/dtex (2 g/denier). The filaments of the yarns may be polymeric or inorganic. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). Another form of suitable yarn is stretch-broken yarn in which filaments having a length of from 2 to about 80 inches (about 5 cm to about 200 cm) are spun and twisted together to form single end yarns having a denier in the range of from 100 to 10,000 denier (111 to 11,000 dtex).

In the case of a fabric comprising only first and second yarns, the filaments of the first and second yarns may be of a different composition or the yarns may be of the same composition but have different moduli. An example of the first type is a first yarn of p-aramid such as Kevlar® and a second yarn of m-aramid such as Nomex®. An example of the second type is a fabric where the first and second yarns are both para-aramid yarns, but the first yarn is a standard modulus yarn such as Kevlar®29 and the second yarn is an intermediate modulus yarn such as Kevlar®49.

In the case of a fabric comprising first, second and third reinforcing yarns, the filaments of the first, second or third yarns may be of different composition. For example, the first yarn may be p-aramid, the second yarn may be m-aramid and the third yarn may be nylon or the first yarn may be p-aramid, the second yarn may be glass and the third yarn may be polyester. In some other embodiments, two of the yarns may be of the same composition but of different moduli and the third yarn is of a different composition from the first and second yarns. In yet another embodiment, the filaments of the first, second and third yarns may be of the same composition but all three yarns have different moduli as exemplified by standard, intermediate and high modulus carbon fibers.

The filaments comprising the first, second or third yarns may be aromatic polyamide, aromatic copolyamide, aliphatic polyamide, glass, carbon, polyester, polyazole, polyolefin or cellulose. Examples of aromatic polyamides are meta-aramid such as Nomex® and para-aramid such as Kevlar®. Aliphatic polyamides include a range of nylon materials such as nylon 6,6.

Another suitable fiber is one based on aromatic copolyamide prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

Glass fibers include "E" glass and "S" Glass. E-Glass is a commercially available low alkali glass. One typical composition consists of 54 weight % $SiO_2$, 14 weight % $Al_2O_3$, 22 weight % CaO/MgO, 10 weight % $B_2O_3$ and less then 2 weight % $Na_2O/K_2O$. Some other materials may also be present at impurity levels S-Glass is a commercially available magnesia-alumina-silicate glass. This composition is stiffer, stronger and more expensive than E-glass and is commonly used in polymer matrix composites.

An example of polyester is polyethylene terephthalate (PET).

Examples of cellulosic fiber are cotton, cellulose acetate, and regenerated cellulose fibers known as rayon.

Article

The knit fabric of this invention may be used as a reinforcement for polymeric or elastomeric articles.

Figure 6:
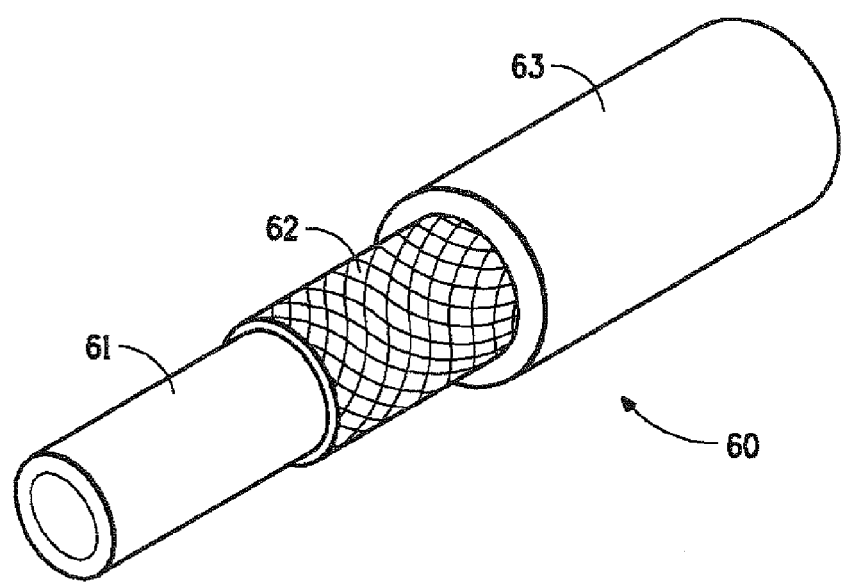
FIG. 6 is a schematic of a hose comprising a knit fabric of this invention.

Examples of elastomeric articles include tires and hoses. The fabric may be used as a load carrying component in the carcass of a tire. FIG. 6 depicts a schematic of a hose comprising a knit fabric of the present invention. The hose is shown generally at 60. The first component is a core tube (61) having a circumferential inner surface which conventionally contacts a fluid or gas and an opposing circumferential outer tube surface. The materials suitable for core tube (61) are elastomeric and are well known in the art. Suitable examples include hydrogenated nitrile rubber, silicone rubber, fluorosilicone rubber, methylphenylsilicone rubber, natural rubber, EPDM, CPE and acrylic rubber. EPDM means ethylene propylene diene monomer rubber; CPE means chlorinated polyethylene. It is understood the elastomeric material which is chosen will be dependent on the final use of the hose. Illustratively, if a corrosive substance is to be transported through the hose, the elastomeric material is chosen to withstand such corrosion. The knit fabric reinforcement layer (62) surrounds the outer surface of the core tube. An elastomeric layer (63) surrounds the reinforcement layer (62) on its outer surface. The type of elastomer can be the same or different relative to the core (61). It is understood that various constructions may be employed. Illustratively, more than two reinforcement layers (62) can be utilized. Furthermore, the core tube (61) can be lined on its inner surface with a fluorocarbon-based material which will contact the fluid or gas to be transported. Suitable examples of such lining materials include poly(tetrafluoroethylene) and perfluoroalkoxy polymer.

Another example of the use of the knit fabric is a polymeric is composite comprising the knit reinforcement and a matrix resin which may be thermoplastic or thermoset. Typically, the fabric comprises from 25 to 55 weight percent of the weight of fabric plus matrix. In some embodiments the fabric comprises from 30 to 45 weight percent of the weight of fabric plus matrix. Exemplary thermoset matrix resins are epoxy, phenolic, polyester, bismaleimide and cyanate ester. Exemplary thermoplastic resins are polyetheretherkenone (PEEK), polyetherketoneketone (PEKK), polyethersulfone (PES), polyarylsulfone (PAS), polyethylene and polypropylene.

EXAMPLES

In the following examples:

Y1 is a para-aramid yarn available under the tradename Kevlar® 29 from E. I. du Pont de Nemours and Company, Wilmington, Del. (DuPont) having a nominal tenacity of 25.5 g/den and a nominal modulus of 76 GPa. The nominal linear density is 1000 denier.

Y2 is a para-aramid yarn available under the tradename Kevlar® 49 from DuPont having a nominal tenacity of 25.5 g/den and a nominal modulus of 117 GPa. The nominal linear density is 1420 denier.

Y3 is a meta-aramid yarn available under the tradename Nomex® 430 from DuPont having a nominal tenacity of 5.0 g/den and a nominal modulus of 12.7 GPa.

Y4 is a 6K carbon fiber yarn available under the tradename HexTow® AS4 from Hexcel Corporation, Stamford, Conn. (Hexcel) having a nominal tensile strength 4330 MPa and a nominal tensile modulus of 231 GPa.

Y5 is a 6K carbon fiber yarn available under the tradename HexTow® IM7 from Hexcel having a nominal tensile strength 5310 MPa and a nominal tensile modulus of 276 GPa.

Y6 is a 12K carbon fiber yarn available under the tradename HexTow® IM10 from Hexcel having a nominal tensile strength 6964 MPa and a nominal tensile modulus of 303 GPa.

The knitted reinforcement can be made on a Harry Lucas RRU-2×4s model number 5594 knitting machine available from Knitting Machine & Supply Co., Inc. Clark, N.J. This machine is designed for knitting a cover around a rubber tube and can be built with up to 6 cam tracks for lock/skip stitch patterns and 4-12 feed packages for supply filament elements and textile yarns.

The fabric style is of the type known in the trade as jersey or terry knit, also known in the hose trade as a plain stitch. The knit could also be of a lock or skip stitch.

The following examples are given to illustrate the invention and should not be interpreted as limiting it in any way. Examples prepared according to the process or processes of the current invention are indicated by numerical values. Control or Comparative Examples are indicated by letters.

Comparative Example A

Example A is prepared solely from yarns Y3. The knit fabric has the same yarn in every course.

Comparative Example B

Example B is prepared solely from yarns Y1. The knit fabric has the same yarn in every course.

Comparative Example C

Example C is prepared solely from yarns Y4. The knit fabric has the same yarn in every course.

Example 1

Example 1 is prepared from yarns Y1 (first yarn) and Y2 (second yarn). The knit fabric has alternating courses of yarns Y1 and Y2.

Example 2

Example 2 is prepared from yarns Y1 (first yarn) and Y3 (second yarn). The knit fabric has alternating courses of yarns Y1 and Y3.

Example 3

Example 3 is prepared from yarns Y1 (first yarn) and Y2 (second yarn). The courses of the knit fabric form a repeat pattern of, in order, a course comprising a first yarn (Y1), two courses comprising a second yarn (Y2) and a course comprising a first yarn (Y1).

Example 4

Example 4 is prepared from yarns Y1 (first yarn) and Y3 (second yarn). The courses of the knit fabric form a repeat pattern of, in order, a course comprising a second yarn (Y3), two courses comprising a first yarn (Y1) and a course comprising a second yarn (Y3).

Example 5

Example 5 is prepared from yarns Y4 (first yarn), Y5 (second yarn) and Y6 (third yarn). The courses of the knit fabric form a repeat pattern of, in order, a course of first yarns (Y4), followed by two courses of second yarns (Y5), a course of third yarns (Y6) and a course of first yarns (Y4).

Example 6

A hose is made by the extrusion of uncured ethylene propylene diamine (EPDM) compound as an annular tube of circular cross-section and of significantly greater length than diameter. The EPDM compound may be of the type typically used for long life or standard coolant or heater hose applications. The tube is then covered with a knit, formed by a multi-feed circular knitter such as by a Harry Lucas RRU machine. The staging of the feed bobbins or supply bobbins for the forming knit is described in Example 2, in which a plain knit is formed with alternating courses of yarn types by the alternating location of feed packages on the knitter deck. In this instance, an 8 feed knitter is used, such that 4 packages of Y1 and 4 packages of Y2 are placed in a regular alternating pattern on the knitter deck. The knitter places 10 course per inch along the length of the hose and uses 16 needles to form the plain stitch. The tube with knitted yarn is then passed through an annular extrusion die that applies a cover layer of extended EPDM compound as the 'cover layer' to protect the knit from damage and to provide body to the overall hose structure. EPDM compound information can be found in trade literature such as the RT Vanderbilt Rubber Handbook 13$^{th}$ edition, 1990. The assembly is then cut to lengths and formed over steel or aluminum mandrels to be molded into the desired shape during cure in steam at 150C for 15 minutes. The cured rubber hoses are then removed from the mandrels after cooling and subsequently cleaned, trimmed, and tested for commercial sale.

Example 7

A hose is made by the extrusion of uncured silicone compound (VMQ) as an annular tube of circular cross-section and of significantly greater length than diameter. The VMQ compound may be of the type typically used for long life or standard turbocharger or charge-air hose applications.

The tube is then covered with a knit, formed by a multi-feed circular knitter such as by a Harry Lucas RRU machine. The staging of the feed bobbins or supply bobbins for the forming knit is described in Example 5, in which a plain knit is formed with alternating courses of yarn types by the to alternating location of feed packages on the knitter deck. In this instance, a 12 feed knitter is used, such that 4 packages of Y4, 4 packages of Y5, and 4 packages of Y6 are placed in a regular alternating pattern on the knitter deck. For further illustration the yarn packages would form the following pattern repeated 4 times: Y4 Y5 Y6. The knitter places 6 course per inch along the length of the hose and uses 36 needles to form the plain stitch. The tube with knitted yarn is then passed through an annular extrusion die that applies a cover layer of VMQ compound as the 'cover layer' to protect the knit from damage and to provide body to the overall hose structure. VMQ compound information can be found in trade literature such as the RT Vanderbilt Rubber Handbook 13$^{th}$ ed 1990. The assembly is then cut to lengths and formed over steel or aluminum mandrels to be molded into the desired shape during cure in steam at 150C for 15 minutes. The cured rubber hoses are then removed from the mandrels after cooling and subsequently cleaned, trimmed, and tested for commercial sale.

When tested in a loop to loop test, the elongation at break of a knit structure as described above comprising at least two different yarns is greater than the elongation at break of the stiffest yarn of the at least two different yarns and the knit structure has a strength greater than that of a knit comprised solely of the most compliant yarn of the at least two different yarns. When such a knit is built into a hose this will deliver improved pressure performance for volumetric expansion.

What is claimed is:

1. A knit fabric comprising at least three courses of different reinforcement yarns wherein
    (a) each course of the fabric comprises either a first or second or third yarn, the yarn having a tenacity of at least 2.2 g/dtex,
    (b) no more than two successive courses of the fabric comprise the same yarn, and
    (c) the fabric is a reinforcing component of a tubular elastomeric article, a tire or a composite structure.

2. The fabric of claim 1, wherein at least two of the different yarns comprise filaments of the same polymer.

3. The fabric of claim 1, wherein at least two of the different yarns comprise filaments of different polymers.

4. The fabric of claim 1, wherein a first yarn comprises filaments of m-aramid and a second yarn comprises filaments of p-aramid.

5. A hose comprising the knitted fabric of claim 1.

6. A tire comprising the knitted fabric of claim 1.

7. A fiber reinforced composite structure comprising the knitted fabric of claim 1.

* * * * *